United States Patent [19]

Lathlaen

[11] 4,263,525

[45] Apr. 21, 1981

[54] SIGNAL GENERATING MEANS

[75] Inventor: Richard A. Lathlaen, Hatfield, Pa.

[73] Assignee: TRW, Inc., Cleveland, Ohio

[21] Appl. No.: 32,137

[22] Filed: Apr. 23, 1979

Related U.S. Application Data

[63] Continuation-in-part of Ser. No. 972,865, Dec. 26, 1978.

[51] Int. Cl.² .................................. H02K 21/38
[52] U.S. Cl. ................................ 310/155; 365/133; 310/168; 310/111; 123/146.5 A
[58] Field of Search ............... 360/155, 168, 111, 156, 360/154, 152; 365/133; 148/103, 108, 120, 31.57; 123/146.5 A, 148 E

[56] References Cited

U.S. PATENT DOCUMENTS

| 3,757,754 | 9/1973 | Wiegand | 723/146.5 A |
|---|---|---|---|
| 3,780,313 | 12/1973 | Wiegand | 310/168 X |
| 3,818,465 | 6/1974 | Wiegand | 365/133 |
| 3,820,090 | 6/1974 | Wiegand | 148/120 |
| 3,866,193 | 2/1975 | Wiegand | 365/133 |
| 3,892,118 | 7/1975 | Wiegand | 365/133 |
| 4,150,314 | 4/1979 | Fabler et al. | 310/155 |
| 4,157,482 | 6/1979 | Kakinuma | 310/155 |

OTHER PUBLICATIONS

Philip E. Wigen, "Wiegand Wire: New Material For Magnetic-Based Devices", Electronics, Jul. 10, 1975, pp. 100–105.
"Wiegand Pulses Break Through Into New Applications", Canadian Controls and Instrumentation, Dec. 1977, pp. 16–19.
"Wiegand Effect A New Pulse-Generating Option", Automotive Engineering, Feb. 1978, pp. 44–48.
Michael J. Sinko, "Applying The Wiegand Effect To Your Design", Digital Electronic Conference 1978.
David J. Marks and Michael J. Sinko, "The Wiegand Effect And Its Automotive Applications", Tech. Paper #780208, Congress and Expositions of Society of Automotive Engineers, Feb. 27, Mar. 3, 1978.
Earle Dilatush, "With No External Power Source, Clean Pulse-Generation Technique Creates Narrow, High-Level Outputs", EDN, Nov. 5, 1977 pp. 19–20.
"Electronic Ignition Systems For Motor Vehicles", Electronic Engineering, Dec. 1974, pp. 51–55.
"Wiegand Effect Simplifies Automotive Ignition Circuitry, Machine Design, Aug. 8, 1977, p. 8.

Primary Examiner—Donovan F. Duggan
Attorney, Agent, or Firm—Jacob Trachtman

[57] ABSTRACT

A signal generating means comprising a bistable magnetic device which alters its magnetic state when the density of magnetic flux to which it is subject passes through a predetermined value, and detecting means providing an output signal responsive to a change in magnetic state of said bistable device. A conducting means comprising first and second portions conducts magnetic flux in first and second paths and subjects the bistable magnetic device which is connected between the first and second portions to the conducted magnetic flux. The second portion provides the second path with an alterable permeance for varying the reluctance of the second path of the conducting means, and an energizing means provides magnetic flux to the conducting means having a sense along the first path through the bistable device which is opposite to its sense in the second path. The density and sense of magnetic flux to which the bistable device is subject to changes with the variation of reluctance of the second path of the conducting means to alter its state.

38 Claims, 11 Drawing Figures

SIGNAL GENERATING MEANS

CROSS-REFERENCE TO RELATED APPLICATION

This is a continuation-in-part of my copending application Ser. No. 972,865 filed Dec. 26, 1978 and entitled SIGNAL GENERATING DEVICE.

BACKGROUND OF THE INVENTION

The invention relates to a signal generating means, and more particularly to a means for detecting the position and sensing the frequency of rotation of a rotary body.

Heretofore, detecting devices have determined position and frequency by the sensing of an emission from a rotating shaft, such as detecting the magnetic field of a rotating magnet or electromagnet, or responding to a light source on a turning element by using a light detector. In each such devices, the source of emanations is secured to the object whose motion is being detected. In another form, proximity detectors which use magnets, light sources, and acoustic generators as part of a stationary assembly, react to nearby variations in a passive media which is to have its motion detected. In still another form, position and motion detectors are made to include a specialized form for the rotating element, and operate to modify as a function of position, the emanations from a stationary source.

SUMMARY OF THE INVENTION

The present invention relates to the latter type of a device in which a stationary bistable magnetic device senses the magnetic properties of a rotating member. The invention in this form provides many advantages including the ability to accurately detect the position of the rotating member and the frequency of its rotation. Highly accurate position detecting and frequency sensing are essential for various control functions.

Thus, the present invention, among its many applications, may be utilized for providing highly accurate timing signals for controlling the production of ignition signals, for delivery to the spark plugs of an internal combustion engine. The output signals are provided at required angular positions of a rotary member, such as the position of an engine crankshaft for providing timing signals, and occurring at a frequency corresponding to its rate of rotation. The output signals may also be advanced by an electrical control signal. The output signals may also be used for indicating the speed and mileage of a vehicle in which the rotation of the wheels are detected.

It is therefore an object of the present invention to provide a new and improved signal generating means for detecting the position and sensing the frequency of a rotary member.

Another object of the invention is to provide a new and improved signal generating means for providing output signals at selected angular positions of a rotary member and representing its position and the frequency of rotation.

Another object of the invention is to provide a new and improved signal generating means for providing timing signals which may be controlled and advanced by an electrical control signal.

Another object of the invention is to provide a new and improved signal generating means utilizing a stationary magnetic source and stationary magnetic flux detector for providing output signals indicating the position of a rotary member and its rotational frequency.

Another object of the invention is to provide a new and improved signal generating means for sensing the position and frequency of rotation of a body or shaft by requiring only minor modification of the rotating body or shaft.

Another object of the present invention is to provide a new and improved signal generating means which is less expensive to produce and is highly efficient, reliable and durable.

The above objects and advantages, as well as many other advantages are achieved by providing a signal generating means comprising a bistable magnetic device which alters its magnetic state when the density of magnetic flux to which it is subject passes through a predetermined value. A detector winding positioned about the bistable device provides an output signal responsive to a change in magnetic state of the bistable device. A conducting means comprising first and second portions conducts magnetic flux in first and second paths and subjects the bistable magnetic device to conducted magnetic flux. The bistable device is connected between the first and second portions of the conducting means for conducting therethrough magnetic flux in the first and second paths. The second portion provides the second path with an alterable permeance for varying the reluctance of the second path of the conducting means. An energizing means provides magnetic flux to the conducting means having a sense along the first path through the bistable device which is opposite to its sense in the second path, the density and sense of magnetic flux to which said bistable device is subject changing with the variation of reluctance of the second path of the conducting means to alter the state of the bistable device.

While the reluctance of the first path is maintained substantially constant, a rotatable member provides a maximum value of reluctance for the second path when it is in one angular position, and a minimum value of reluctance for the second path when it is in another angular position. The rotation of the member between these positions provides respective reluctance values for the second path which vary between respective minimum and maximum values as a function of the angular position of the member. This provides a magnetic flux density along the first path through said bistable device which is substantially constant, while the magnetic fluc density in the opposite sense along the second path varies between a value above and a value below the value of the magnetic flux along the first path and in correspondence with the varying of the reluctance of the second path.

The member may be rotationally driven in synchronism with an engine for providing output signals by the detecting means which are indicative of the angular position or frequency of rotation of the crank shaft or wheels of a vehicle indicating position, speed, and mileage. The member may also be provided in the form of an impeller wheel for a fluid flow device for being driven by the flow of fluid therethrough and indicating the flow rate and quantity of fluid. The energizing means which is stationary may comprise a permanent magnet, electromagnet or a combination of them, while the bistable device which is also stationary may be provided by a Wiegand wire which is subject to the varying magnetic flux densities, first in one sense and then in the other for producing the output signals of the detecting means.

BRIEF DESCRIPTION OF THE DRAWING

The foregoing and other objects of the invention will become more apparent as the following detailed description of the invention is read in conjunction with the drawing, in which.

Like reference numerals designate like parts throughout the several views.

DETAILED DESCRIPTION

Figure 1:
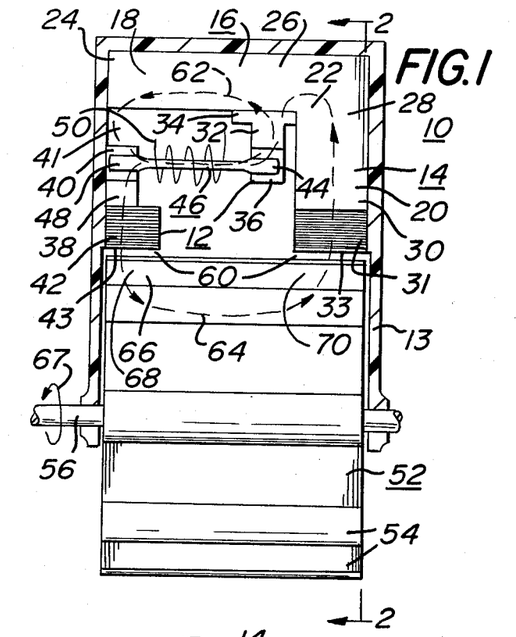
FIG. 1 is a diagrammatic elevational view in section of a signal generating means embodying the invention.
Figure 2:
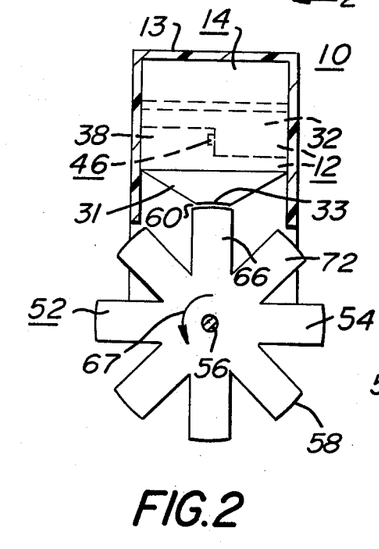
FIG. 2 is a sectional view taken on line 2—2 of FIG. 1.

FIGS. 1 to 4 illustrate a signal generating means 10 embodying the invention. The means 10 includes a conducting means 12 for magnetic flux and an energizing means 14. The energizing means 14 is a permanent magnet 16 secured within a housing 13 and having a "L" shaped configuration with a horizontal section 18 and a vertical section 20 joined at 22. The first section 18 of the magnet 16 has north and south poles at its ends 24 and 26, while the second section 20 has north and south poles at its ends 28 and 30. The end 30 of the vertical section 20 is provided with a downwardly extending pole piece 31, which as seen from FIG. 2 is tapered to provide an arcuate end surface 33 of reduced size. The energizing means 14 also may be provided by an electromagnet having a coil energized by direct current with its amplitude being adjustable for controlling the phasing of output signals of the signal generating means 10.

The conducting means 12 includes a first portion 32 which is connected magnetically at its upper end 34 directly to the magnet 16 at the inside corner formed by its sections 18 and 20 and extends vertically downwardly to its bottom end 36. A second portion 38 of the conducting means 12 is secured with the housing 13 with its top end 40 postioned below and spaced from the first end 24 of the first section 18 of the magnet 16 to provide an air gap 41 therebetween. The other end of the second portion 38 extends downwardly and has a second pole piece 42 with a configuration and end surface 43 similar to and spaced across from the pole piece 31 of the magnet 16. The portions 32 and 38 of the conducting means 12 have high permeability, such as provided by known ferromagnetic materials.

A flattened end 44 of a bistable magnetic device 46 is connected, by welding or other suitable means with the lower end 36 of the portion 32 of the conducting means 12. The device 46 has its other flattened end 48 secured with the upper end 40 of the portion 38 of the conducting means 12. As shown in FIG. 1, the device 46 is positioned substantially parallel to the horizontal section 18 of the magnetic 16 and spaced from and substantially perpendicular to the extent of the portions 32 and 38 of the conducting means 12. The device 46 can be positioned in this manner or otherwise for the purpose of obtaining desired operation as will be explained in connection with the operation of the signal generating means 10 and the embodiment shown in FIG. 7. The bistable magnetic device 46 has the form of an elongated wire and provides a magnetic path bridging the first and second portions 32 and 38 of the conducting means 12. The bistable magnetic device 46 is provided with a winding 50 coiled between its ends for detecting and providing the output signals of the signal generating means 10.

A rotatable member 52 with a cylindrical outer configuration and eight equally spaced radially extending teeth or cogs 54 is mounted within the housing 13 for rotation, and can be rotated in either direction about a shaft 56. The shaft 56 may be joined with and driven by another apparatus or device which is to have its position detected or its rotational frequency sensed. The member 52, also may be an integral part of a device such as an engine crankshaft or drive shaft which is to have its position and frequency of rotation determined by the signal generating means 10. The member 52 or at least a top portion of the cogs 54 are made of magnetically soft material for providing low reluctance to magnetic flux. The end surface 58 of each of the cogs 54 lies on a circle which is concentric with the circle along which the end surface 33 and 43 of the pole pieces 31 and 42 of magnet 16 and conducting means 12 are positioned. This arrangement provides small air gaps 60 between the respective concentric end surfaces when they are positioned opposite to each other with the rotation of the member 52.

In considering the operation of the signal generating means 10, the magnetic flux from the north pole end 24 of section 18 of the magnet 16 returns to its south pole end 26 by a first path 62 shown by a dashed line in FIG. 1, which extends through the air gap 41, to the end 48 of the bistable device 46 secured with the top end 40 of the portion 38 of the conducting means 12, and through the bistable device 46 in the direction towards its other end 44 where it passes through the portion 32 of the conducting means 12 to the junction 22 of the magnet 16. The spacing of the gap 41 between the top 40 of the portion 38 and the end 24 of the section 18 of the magnet 16 is adjustable for controlling the reluctance of the path 62 and the flux which flows along it to provide a density of flux through the bistable device 46 which has a value which is substantially constant in the direction indicated by the arrows of the path 62.

With the member 52 positioned as shown in FIGS. 1 and 2, a second magnetic path 64 shown by a dashed line is provided by the conducting means 12 and member 52, extending in the direction indicated by the arrows, from the north pole end 28 to the south pole end 30 of the section 20 of magnet 16. The path 64 extends from the end 28 of section 20 downwardly from the upper end 34 to the lower end of the first portion 32 of the conducting means 12, and then to the end 44 of the bistable device 46. The flux passes through the bistable device 46 to its other end 48 in the direction opposite to the direction of the flux therethrough in the path 62. From the end 48, the flux in path 64 enters the second portion 38 of the conducting means 12 and extends to the oppositely positioned cog of the member 52 from its pole piece 42 through the air gap 60 therebetween. The flux path 64 leads from the side 68 of the cog 66 proximate to the pole piece 42 along the cog 66 to its other side 70, where it enters the oppositely positioned pole piece 31 of the magnet 16 through the air gap 60 therebetween to return to the south pole end 30 of the magnet 16.

Figure 3:
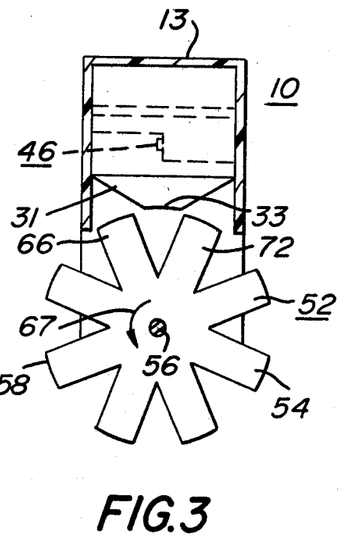
FIG. 3 is a view similar to that of FIG. 2 showing the rotary member displaced by 22.5°.

FIG. 3 shows the member 52 after it has been rotated in the counter clockwise direction (shown by the arrow 67) through an angle of 22.5°. This action moves the cog 66 to the left away from the pole pieces 31 and 42, so that the pole pieces 31 and 42 are positioned intermediate the cog 66 and its adjacently positioned cog 72 of the member 52. The second path 64 for magnetic flux illustrated in FIGS. 1 and 2, has minimum reluctance when the member 52 is angularly positioned as shown. However, its reluctance increases to its maximum value when the member 52 is rotated through 22.5° to the position shown in FIG. 3. As the member 52 moves from one of its positions with a cog 54 opposite the pole pieces 31 and 42 to its other position with the pole pieces 31 and 42 positioned intermediate to adjacent cog 54, the reluctance value of the second path 64 varies between a minimum value and a maximum value as a function of the angular position of the member 52. The density of magnetic flux provided along the second path 64 through bistable device 46 is adjusted to vary between respective values above and below the substantially constant value of the magnetic flux and in the direction opposite to the flux along the first path, in correspondance with the varying of the reluctance of the second path 64.

Since the flux through the first and second paths 62 and 64 pass in opposite directions or senses through the bistable magnetic device 46, the bistable device 46 is subjected to a net resultant magnetic flux which varies in amplitude and direction or sense. Thus, when the reluctance of the second path 64 is minimum, the net flux through the bistable device 46 is in the direction to the left from the portion 32 to the portion 38 of the conducting means 12. Similarly, when the reluctance of the second path 64 is maximum, the net flux produced is to the right through the device 46 from the portion 38 to the portion 32 of the conducting means 12. With the variations of flux between respective maximum values in opposite directions, the flux density through the bistable device 46 decreases from a maximum value in one direction or sense to zero value, and then increases in the other direction or sense to its other maximum value. Such variations take place continuously with the rotation of the member 52. For the embodiment illustrated, the eight cogs 54 of the member 52 provide eight alterations of flux density through the device 46 with each rotation of the member 52, with one alternation for each 45° of angular displacement.

Under certain circumstances, it may be advantageous to obtain asymmetric operation of the bistable magnetic device 46. This may be accomplished by the arrangement of the components of the signal generating means 10. Such operation of the device 46 occurs when the device 46 is subjected to a maximum flux density in one direction or sense which is greater than the maximum flux density in the opposite sense. This is achieved in the disclosed embodiment by the arrangement of the components and the positioning the device 46 with respect to the magnet 16. This can also result from subjecting the device 46 in an unbalanced manner to the magnetic flux present in the air space surrounding the magnet 16 for obtaining the desired operation. Thus, because of its orientation, the device 46 in addition to receiving magnetic flux conducted in the paths 62 and 64 of the conducting means 12, also receives flux through the air paths between the pole ends of the magnet 16. This may result in increasing or reducing the maximum flux value in the direction of paths 62 or 64 for adjusting the value of maximum flux provided through the device 46 as the member 52 rotates.

In addition to the effect on the bistable magnetic device 46 of the flux field around the magnet 16, the conducting means 12 is polarized by the flux which it conducts, and also produces a magnetic field in the air space about it. Thus, the effect of the flux along the paths 62 and 64 in the first and second portions 32 and 38 of the conducting means 12 must also be considered, and the bistable magnetic device 46 positioned with respect thereto for obtaining the desired operation. The air gap 41 is adjustable for changing the reluctance in the first path 62, thereby also controlling the effect of magnetic flux on the bistable magnetic device 46. Thus, by adjusting the positions of the components and of the magnetic device 46, the relationship between the maximum values of the alternating flux to which it is subjected may be controlled and changed. In the case where the device 46 is to be symmetrically operated and subjected to maximum values of flux which are the same in either direction, the disposition of the device 46 may be altered by changing the configuration of the conducting means 12 and the angular disposition of the device 46 with respect to the magnet 16 and the reluctances of the paths are adjusted to achieve the desired results.

Figures 5A, 5B:
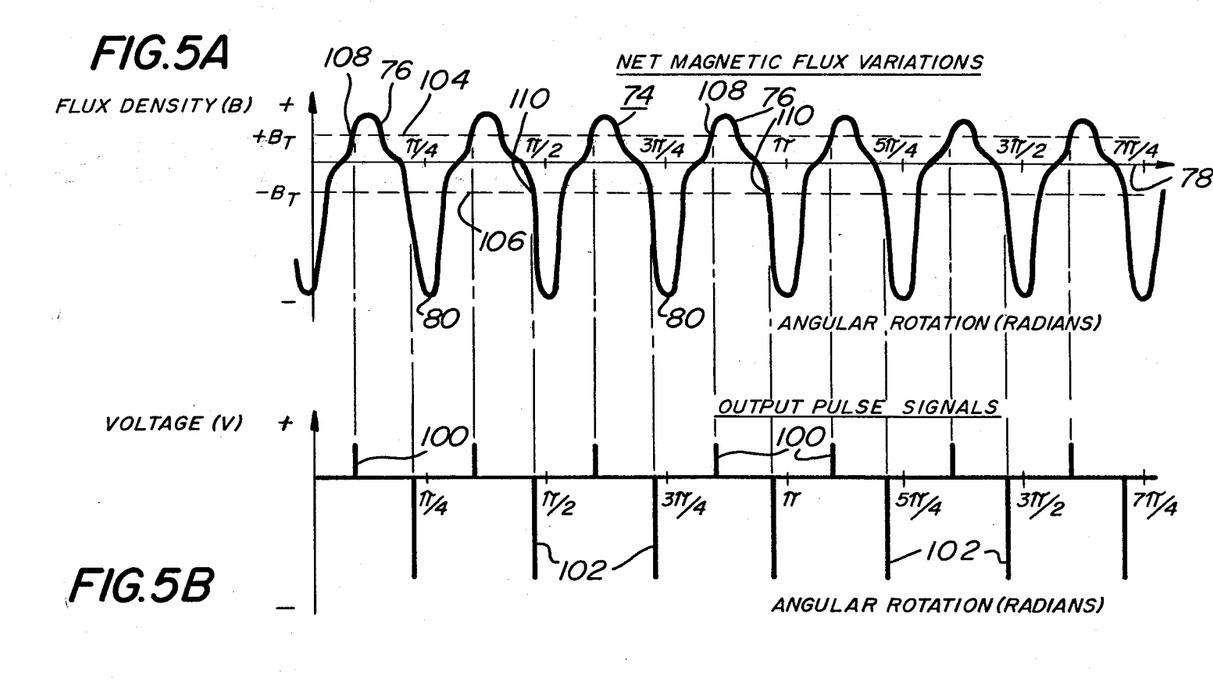

The curve 74 in FIG. 5A represents the variation of total net magnetic flux through the bistable magnetic device 46 with angular rotation of the member 52. The portion 76 of the curve 74 above the horizontal axis 78, represent the magnetic flux density through the device 46 in the direction to the right along the path 62 shown in FIG. 1. As the member 52 rotates, the flux reaches a maximum value after which it decreases to zero value and crosses the axis 78 in the downward direction. The portions of the curve 80 below the axis 78 represent the total net magnetic flux density in the opposite direction which passes to the left through the bistable magnetic device 46 as also illustrated in FIG. 1. Th flux reaches a maximum value in this negative sense after which it returns to zero value and crosses the axis 78 in the upward direction. As seen in FIG. 5A, the curve 74 goes from a maximum value in the positive direction to a maximum value in the negative direction for each rotation of $\pi/8$ radians, and executes a full cycle in $\pi/4$ radians or 45°. The smaller positive maximum amplitude of the portions 76 of the curve 74 with respect to the greater maximum amplitude of the negative going portions 80 of the curve 74, illustrates the asymmetric condition of operation to which the bistable magnetic device 46 may be subjected.

Figure 6:
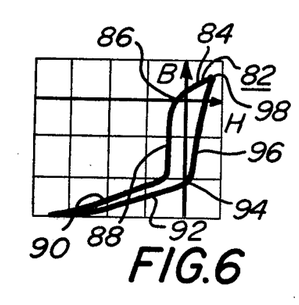
FIG. 6 is a graph illustrating the hysteresis characteristic of a bistable magnetic device which is driven asymmetrically.

For a description of the asymmetric switching operation of a bistable magnetic device 46, reference is made to the hysteresis curve 82 of FIG. 6. The bistable magnetic device 46 may be of the type described in U.S. Pat. No. 3,820,090 issued June 15, 1974 entitled "Bistable Magnetic Devices." Such a bistable device 46 is also known as a Wiegand wire and comprises a wire of general uniform composition having a centrally relatively "soft" core portion and an outer relatively "hard" magnetized shell portion with relatively low and high coercivities, respectively. Such a Wiegand wire or device 46 may be made by properly work hardening a homogeneous magnetic alloy to provide the relatively "hard" shell portion of high coercivity with respect to the central core. The device provides a high energy stage when its flux extends externally, and a low energy state when its flux is substantially internal. In the low energy state, the flux in the shell captures and has a return path through the core of the device. Switching of the bistable magnetic device 46 occurs when the density of an applied external flux passes through a value which allows the applied flux to capture the core of the device from its shell. This results in a rapid increase in external flux density known as the "Wiegand Effect." This effect is detected as an output pulse signal by the detector winding 50. This phenomenon is also explained in detail in an article entitled "Wiegand Wire: New Material For Magnetic-Based Devices" by Philip E. Wignen in Electronics dated July 10, 1975, and in the article entitled "Wiegand Pulses Break Through Into New Applications" in Canadian Controls & Instrumentation dated December 1977. Although the hysteresis curve 82 of FIG. 6 illustrates a particular magnetic switching characteristic of the bistable magnetic device 46, devices with other characteristics or devices operated symmetrically may also be utilized as noted and illustrated in the article by Philip E. Wignen.

In considering the operation of the bistable magnetic device 46, the downwardly sloping portion 84 of the hysteresis curve 82 of FIG. 6 illustrates the change in magnetic density B of the bistable device 46 with a decrease in the applied magnetic field intensity H. The magnetic field intensity H is related to the external magnetic flux density B to which the bistable magnetic device 46 is subjected. When the intensity H reaches the level 86 beyond the zero value in a negative sense, a rapid change in flux density B of the device 46 occurs. This is indicated by the steep downward slope in the negative direction of the portion 88 of the curve, providing the switching action of the bistable magnetic device 46. A further increase of the magnetic field intensity H in the negative direction, results in a smaller gradual negative increase in flux density B as illustrated by the reduced slope of the line 90. With the return of the magnetic field intensity H to zero value, and its increase in the positive direction, a gradual decrease in flux density B takes place as illustrated by the upward slope of the line 92. When the magnetic field intensity H reaches the value at point 94, a rapid change in the flux density B again occurs as illustrated by the upwardly curving line 96. This provides a second switching action of the device 46. At this time, the flux density B moves upwardly through zero value and increases in the positive direction to the level illustrated at location 98. From the asymmetric nature of the curve 82, it is noted that its slope 96 is considerably less than the almost vertical slope 88 occurring during the other switching action. The limited energization of the device 46 by the magnetic field intensity H in the positive going direction because of the small positive going portions 76 of the curve 74 in FIG. 5A, causes the curve 82 to reverse at location 98. This provides an asymmetrical configuration as the curve 82 slopes downwardly along the portion 84 to start a new cycle.

Subjecting the bistable magnetic device 46 to asymmetric operation results in the magnetization of its "hard" outer shell in only one direction, without the reversal of the shell magnetism during the energization cycle as could occur during symmetrical operation. The core of the device 46, however, still switches from magnetization in one direction to the other, to provide the two switching actions for each hysteresis cycle. The result is a slower switching slope 96 in the positive direction than that obtained by the slope 88 in the negative direction. Since the output voltage produced by the detector winding 50 about the bistable magnetic device 46 is a function of the rate of change of the magnetic flux density B during the switching operation, the larger signal results at the portion 88 of the hysteresis curve 82 than at portion 96. This provides an output signal by the detector winding 50 with correspondingly smaller positive and larger negative pulses.

The output signals produced are illustrated in FIG. 5B with the amplitude of the positive going pulses 100 being smaller than the amplitude of the negative going pulses 102. The times of occurrence of the output pulses 100 and 102 are determined by the positive and negative flux density thresholds $B_T$ for switching of the device 46, which values are illustrated by the dashed lines 104 and 106, respectively of FIG. 5A. Each time the positive portion 76 of the curve 74 increases in the positive direction to reach the threshold value of flux density $B_T$, as at the points 108, the bistable magnetic device 46 switches state. Because of the rapid changes in its flux density, the pulses 100 are generated. These pulses 100 correspond to locations which are angularly displaced from each other by $\pi/4$ radians or 45°. Similarly, when the negative going portions 80 of the curve 76 increase in the negative direction to reach the negative threshold flux density $B_T$ represented by line 106, at the points 110, corresponding negative going pulses 102 are generated. However, because of the very rapid change in flux density, the negative pulses 102 each have a much larger amplitude than the amplitude of the positive pulses 100. These pulses 102 occur intermediate to the pulses 100 and also are displaced from each other by $\pi/4$ radians or 45°.

For some purposes, it may be desirable to utilize only the pulses of one polarity while pulses of the opposite polarity are neglected. Under such circumstances, it may be desirable to enlarge the amplitude of the desired pulses at the expense of the undesired ones. This may be accomplished by driving the bistable magnetic device 46 asymmetrically, since as noted this increases the amplitude of the pulses which are to be used. In the case where both negative and positive pulses are to be utilized, the device 46 can be driven symmetrically to provide the desirable output signals.

Where it is desirable to control the magnetic intensity of the source, an electromagnet can be used as the energizing means 14, since the current of the electromagnet can be varied to adjust the maximum value of induced magnetic flux B. By such means, the value of maximum flux density to which the bistable magnetic device 46 is subject can be controlled. Since the threshold level of flux density $B_T$ remains unchanged, an increase or decrease in the flux density, as can be seen from FIG. 5A, will advance or retard the positions of the points 108 and 110 at which the curve 76 crosses the positive and negative threshold levels $B_T$ indicated by lines 104 and 106. This also advances or retards the delivery of the output pulse signals shown in FIG. 5B. Such control means for adjusting the occurrence of the output signals, is important particularly where such signals are used for timing purposes. For example, in connection with the ignition system of an internal combustion engine, the timing signals must be advanced and retarded depending upon the rate at which the crankshaft rotates. The detection of the crankshaft rotation rate, thus, may be used for controlling the advancement and retardation of the output signals for proper ignition timing.

The relationship between the rotational positions of the member 52 and the output pulses 100,102 of the detector winding 50, provides an accurate indication of the angular positions of the member 56. The frequency of rotation, is also provided by the frequency of the output pulse signals delivered by the winding 50. Thus, for the embodiment disclosed, one revolution of the member 52 is represented by the occurrence of 16 pulses of which eight are negative output pulses. Of course, it is understood that the member 52 may be modified to produce any number of output pulses for each revolution depending upon design requirements.

Figures 4, 7:
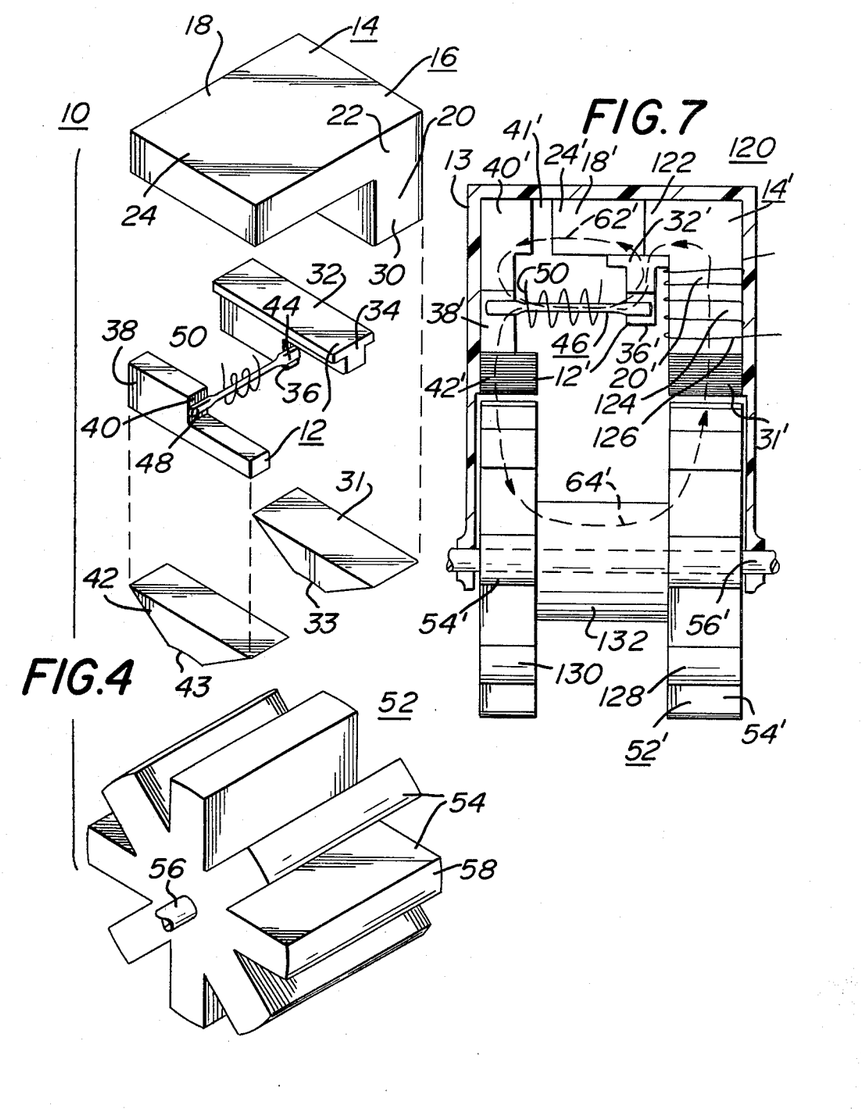
FIG. 4 is an exploded perspective view of the signal generating means of FIG. 1 without its housing, FIG. 5A graphically illustrates the magnitude and sense of the flux variations to which the magnetic bistable device is subjected as a function of the angular position of the rotary member, FIG. 5B graphically illustrates the output signals provided by the signal detecting means as a function of the angular position of its rotary member.
FIG. 7 is a view similar to that of FIG. 1 illustrating a modified form of the signal generating means.

FIG. 7 illustrates a signal generating means 120 which is a modified form of the means 10 embodying the invention. Because of the similarities between the signal generating means 120 and the means 10, only the differences will be described in detail. The energizing means 14' of the signal generating means 120 has a substantially "L" configuration with a horizontal portion 122 and a vertical portion 124. The horizontal portion 122 has a first section 18' comprising a permanent magnet while the remainder is made of a material such as soft iron providing high permeability. The vertical portion 124 of the energizing means 14' provides a second section 20' with an energizing coil 126 wound about it to provide an electromagnet. The coil may be activated by direct current from a source (not shown) providing an adjustable current amplitude for controlling the timing of the output signals of the winding 50 of the device 46.

The conducting means 12' includes a first portion 32' joined to the inner corner of the energizing means 14' and a second portion 38' which is elongated and extends upwardly to the top wall of the housing 13 with its end 40' forming an air gap 41' with the end 24' of the magnet of the first section 18'. The bistable magnetic device 46 has its right end connected with the lower end 36' of the portion 32' of the conducting means 12', and its left end joined to the region intermediate the ends 40' and 42' of the second portion 38'.

The rotary member 52' comprises a pair of separate identical cog wheels 128, 130 each provided with a plurality of equally spaced radially extending cogs 54'. The cog wheels 128 and 130 are secured together in spaced and aligned arrangement by an intermediate connecting hub 132. The wheels 128, 130 and hub 132 of the member 52' are made of a material having high permeability, to provide a path of low reluctance to magnetic flux. The member 52' has an axial shaft 56' about which the member 52' rotates and which extends through the housing 13 for external rotary actuation.

The signal generating means 120 operates in substantially the same manner as described in connection with the means 10, in which the permanent magnet of the first section 18' of the energizing means 14' provides magnet flux for the first path 62', while the winding 126 of the electromagnet of the second section 20' is energized to provide flux for the second path 64'. The density of the magnetic flux of the second path 64' may be controlled by the current amplitude provided to the coil 126. By adjusting the amplitude of the direct current to the coil 126, the timing of output pulses may be varied and controlled as explained above in connection with FIGS. 5A and 5B.

With the rotation of the member 52', the cogs 54' are periodically and simultaneously aligned with the pole piece 31' of the energizing means 14' and the pole piece 42' of the conducting means 12' to produce minimum reluctance for the path 64'. The reluctance of path 64' varies between the minimum and maximum values with the rotation of the member 52' to operate and achieve the results as described in connection with the signal generating means 10. The particular form of the rotary member 52', however, allows it to be manufactured by stamp forming the individual cog wheels 128, 130 from material of high permeability, and thereafter joining them in spaced aligned relationship with the intermediate portion 132. The member 52' may be more easily produced and at less cost while still operating in the same manner as the unitary rotary member 52 described in connection with the signal generating means 10.

Figures 8, 9, 10:
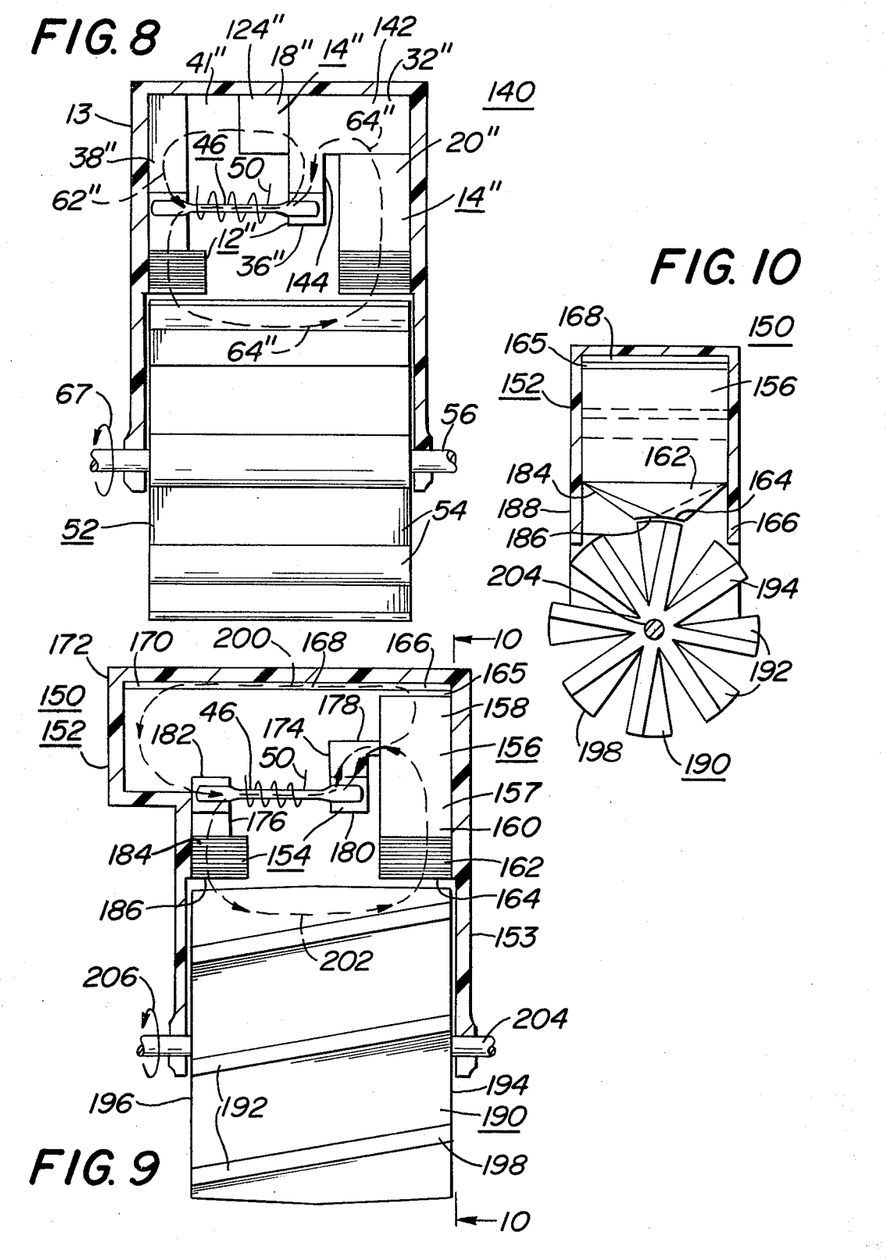
FIG. 8 is a view similar to that of FIG. 1 illustrating another modified form of the signal generating means.
FIG. 9 is a view similar to that of FIG. 1 illustrating still another modified form of the signal generating means.
FIG. 10 is a sectional view taken on line 10—10 of FIG. 9.

FIG. 8 illustrates a signal generating means 140 which is another modified form of the signal generating means 10 embodying the invention. Because of the similarities between the signal generating means 140 and the signal generating means 10 and 120, only the essential differences therebetween will be described in detail.

A conducting means 12" for magnetic flux and an energizing means 14" of the signal generating means 140 are received within the housing 13. The energizing means 14" has a first horizontal section 18" positioned at the top of the housing 13 comprising a permanent magnet with north and south magnetic poles at its left and right ends, and a second section 20" comprising a second longer permanent magnet extending vertically along the right side of the housing 13 with its north and south magnetic pole at its top and bottom ends.

The conducting means 12" comprises a first portion 32" and a second portion 38". The first portion 32" has a horizontally extending top end 142 located at the top of the housing 13 between the right end of the first section 18" of the energizing means 14" and the right wall of housing 13. The top end 142 at its bottom abuts the top end of the vertical section 20" of the energizing means 14". The first portion 32" of the conducting means 12" has a second section 144 which extends downwardly from the left side of its top end 142 in spaced relationship to the vertical section 20" of the energizing means 14".

The second portion 38" of the conducting means 12" is separate from the first portion 32" and has a configuration and position which is similar to that of the second portion 38' of the signal generating means 120 of FIG. 7. A space 41" of air or low permeability material is provided between the upper end of the second portion 38" of the conducting means 12" and the left end of the horizontal first portion 18" of the energizing means 14". The ends of the bistable magnetic device 46 are respectively connected to the bottom end 36" of the first portion 32″, and the intermediate region of the second portion 38″ of the conducting means 12″.

The signal generating means 140 is also provided with the rotary member 52 having the plurality of cogs 54 which may be identical or similar to that of the signal generating means 10. The signal generating means 140 operates in a manner similar to that described in connection with the signal generating means 10 and 120 by providing a first path 62″ for magnetic flux of substantially constant reluctance, and a second path 64″ for magnetic flux having a reluctance which varies between minimum and maximum values with the rotation of the rotary member 52. As noted in connection with the means 10 and 120, the conducting means 12″ is made of a material such as a ferromagnetic substance which provides high permeability, and the air gap 41″ is adjusted to provide a desired density through the bistable magnetic device 46 in the direction of the path 62″. The respective flux densities produced by the first and second magnets are adjusted so that the maximum flux density provided through the bistable device 46 by the magnet of the second section 20″ of the energizing means 14″ is greater than the substantially constant flux density provided by the magnet of the first section 18″. The operation of the signal generating means 140 produces the desirable results of the invention which are similar to the results provided by the other disclosed embodiments of the invention.

FIGS. 9 and 10 illustrate a signal generation means 150 which is still another modified form of the signal generating means 10 embodying the invention and utilizing a different arrangement of components to provide the operation and desirable results of the invention. Because of the similarities of this embodiment to the others previously described, only the essential differences of the signal generating means 150 will be considered in detail.

The signal generating means 150 has a housing 152 made of a non magnetic material which receives within it a magnetic flux conducting means 154 and an energizing means 156. The energizing means 156 comprises an elongated permanent magnet 157 which extends vertically along the right side wall 153 of the housing 152 providing opposite magnetic poles at its upper and lower end 158 and 160. A pole piece 162 of high permeability is provided at the lower end 160 of the magnet 157. The pole piece 162 tapers downwardly to provide an arcuate end surface 164 (FIG. 10) which is offset towards the side wall 166 of the housing 152. The upper end 158 of the magnet 157 is separated by a space 165 from an end 166 of an elongated thin plate 168 of the conducting means 154 which is made of a high permeability material for conducting flux from the magnet 157. The space 165 may be an air gap or provided by a material having low or other desired permeability. From its end 166, the plate 168 extends horizontally along the top portion of the housing 152 into an enlarged region 172 to receive its other end 170.

The conducting means 154 also has first and second portions 174 and 176 made of a material providing high permeability. The first portion 174 of the conducting means 154 has a top horizontal section 178 and a second section 180 extending downwardly from the top section 178 in spaced relation to the energizing means 156. The top section 178 has its right end engaging the magnet 157 of the energizing means 156 at a location intermediate to its ends 158 and 160 and preferably closer to its top end 158. The second portion 176 of the conducting means 154 is positioned to extend downwardly within the housing 152 with its top end 182 spaced across from the bottom end of section 180 of the first portion 174 of the conducting means 154. The bottom end of the second portion 176 of the conducting means 154 is provided with a pole piece 184 which tapers downwardly to a reduced size providing a curved end surface 186. As seen in FIG. 10, the curved end surface 186 is offset with respect to the curved end surface 164 of the pole piece 162, in the direction towards the wall 188 of the housing 152. The bistable magnetic device 46 has one of its ends connected with the lower end of the first portion 174 of the conducting means 154, and its other end connected with the top of the second portion 176.

A rotary member 190 made at least in part of a material of high permeability, has a generally cylindrical configuration and is provided with a plurality of cogs 192 which extend from its central hub region and is rotatable about a shaft 204 as indicated by the arrow 206. The angular disposition of each cog 192 changes continuously in the direction from one side 194 to the other side 196 of the member 190, so that its outer top surface 198 has a substantially spiral or curved configuration. The end surfaces 164 and 186 of the pole pieces 162 and 184 are correspondingly offset with respect to each other, so that each is opposite to the top surface 198 of a cog 192 at the same time at the opposite sides 194, 196 of the member 190.

In operation, the magnet 157 of the energizing means 156 provides magnetic flux for a first path 200 (shown by the dashed line in the direction of the arrows) which extends from its end 158 through the gap 165 to the end 166 of the plate 168 and towards its opposite end 170. The flux path then extends through the air space into the bistable magnetic device 46 by means of the top end 182 of the second portion 176 of the conducting means 154, and through the bistable magnetic device 46 to the bottom section 180 of the first portion 174 of the conducting means 154. From the top section 178 of the first portion 174, the flux returns to the magnet 157 of the energizing means 156 at a region intermediate its ends. Magnetic flux is thus provided by an upper portion of the magnet 157 in the direction indicated by the arrows of the path 200 with a substantially constant magnetic density through the bistable magnetic device 46.

A second path 202 for magnetic flux (shown by the dashed line in the direction of the arrows) is provided by the lower portion of the magnet 157 of the energizing means 156 and extends through the first portion 174 of the conducting means 154 from its upper section 178 to its lower section 180, and through the bistable magnetic device 46 to its other end in a direction opposite to that of the flux in the first path 200. The flux from the device 46 then extends into the second portion 176 and from its pole piece 184 into and through the rotary member 190 to the pole piece 162 through the respective air gaps provided at the pole pieces for return to the lower end 160 of the magnet 157 of the energizing means 156. As explained in connection with the other embodiments, the reluctance of the second path 202 varies with the rotation of the member 190. A minimum value of reluctance is provided each time the curved end surfaces 164, 186 of pole pieces 162, 184 are respectively directly opposite to a region of the top surface 198 of a cog 192 of the rotary member 190, while a maximum reluctance is provided each time the rotary member 190 is positioned intermediate the positions of minimum reluctance. The reluctance of the path 202 varies between the minimum and maximum values with the rotation of the member 190 about a shaft 204.

Although the member 190 may be rotated by actuation of the shaft 204, the particular form of the member 190 adapts it for being received into a fluid medium for measuring the rate of fluid flow and fluid quantity. The flow of fluid from one side 196 to the other 194 of the member 190, will impart rotary movement to the member 190 because of the angular displacement of the cogs 192 from one side 194, 196 to the other of the member 190. With the rotation of the member 190, the signal generating means 150, operates in a manner similar to that of the other embodiments disclosed to provide the desirable results of the invention.

Although the invention has been described with respect to a particular embodiment, it will be obvious to those skilled in the art, that the invention disclosed may be modified to meet various design requirements without substantial departure from the essence of the invention.

What is claimed is:

1. A signal generating means comprising a bistable magnetic device which alters its magnetic state when the density of magnetic flux to which it is subject passes through a predetermined value, detecting means providing an output signal responsive to a change in magnetic state of said bistable device, conducting means comprising first and second portions for conducting magnetic flux in first and second paths and subjecting said bistable device to conducted magnetic flux, said bistable device being connected between the first and second portions of said conducting means for conducting therethrough magnetic flux in the first and second paths, the second portion providing the second path with an alterable permeance for varying the reluctance of the second path, and energizing means for providing magnetic flux to said conducting means having a sense along the first path through the bistable device which is opposite to its sense in the second path, the density and sense of the magnetic flux to which said bistable device is subject changing with the variation of reluctance of the second path of said conducting means to alter the state of said bistable device.

2. The means of claim 1 in which the density of magnetic flux along the first path through said bistable device has a value which is substantially constant, while the density of magnetic flux in the opposite sense along the second path through said bistable device varies between a value above and a value below the value of the magnetic flux along the first path and in correspondence with the varying of the reluctance of the second path.

3. The means of claim 1 in which the second portion of the conducting means includes regions of respectively high and variable permeabilities for providing the second path with varying reluctance to the magnetic flux provided by said energizing means.

4. The means of claim 3 in which the first portion of said conducting means provides the first path with substantially constant reluctance to the magnetic flux provided by said energizing means.

5. The means of claim 4 in which said energizing means has first and second sections for providing magnetic flux along the first and second paths of said conducting means, the density of the magnetic flux along the first path through said bistable device has a value which is substantially constant, while the density of magnetic flux in the opposite sense along the second path through said bistable device varies between a value above and a value below the value of the magnetic flux along the first path in correspondance with the varying of the reluctance of the second path.

6. The means of claim 3 or 5 in which the variable permeability of the second path is provided by a variable air gap.

7. The means of claim 3 or 5 in which the variable permeability of the second path is provided by a fixed gap of reduced permeability and a member providing a path of high permeability movable within the fixed gap.

8. The means of claim 3 or 5 in which the variable permeability of the second path is provided by a fixed gap of reduced permeability and a member providing a path of high permeability rotatably movable for bridging the fixed gap and periodically varying the reluctance of the second path of the conducting means.

9. The means of claim 3 or 5 in which the variable permeability of the second path is provided by a fixed gap of reduced permeability and a member providing a path of high permeability rotatably movable for bridging the fixed gap and periodically varying the reluctance of the second path of the conducting means, the member providing a maximum value of reluctance for the second path when it is in one angular position and a minimum value of reluctance for the second path when it is in another angular position, said member providing reluctance values for the second path varying between the maximum and minimum values as a function of angular position of said member.

10. The means of claim 1 in which said energizing means has first and second sections for providing magnetic flux along the first and second paths of said conducting means.

11. The means of claim 10 in which the first section of said energizing means provides magnetic flux along the first path through said bistable device and the first portion of said conducting means, the magnetic flux through said bistable device along the first path has a substantially constant density, the second section of said energizing means provides magnetic flux along the second path through the first portion of the said conducting means, said bistable device, and the second portion of the conducting means, and the magnetic flux through said bistable device along the second path has a density which varies with the varying of the reluctance of the second path.

12. The means of claim 10 in which the second portion of the conducting means includes regions of respectively high and variable permeabilities for providing the second path with varying reluctance to the magnetic flux provided by said energizing means.

13. The means of claim 12 in whch the variable permeability of the second path is provided by a variable air gap.

14. The means of claim 12 in which the variable permeability of the second path is provided by a fixed gap of reduced permeability and a member providing a path of high permeability movable within the fixed gap.

15. The means of claim 12 in which the variable permeability of the second path is provided by a fixed gap of reduced permeability and a member providing a path of high permeability rotatably movable for bridging the fixed gap and periodically varying the reluctance of the second path of the conducting means.

16. The means of claim 15 in which the member provides a maximum value of reluctance for the second path when it is in one angular position and a minimum value of reluctance for the second path when it is in another angular position, said member providing reluctance values for the second path varying between the maximum and minimum values as a function of angular position of said member.

17. The means of claim 16 in which the density of magnetic flux along the first path through said bistable device has a value which is substantially constant, while the density of magnetic flux in the opposite sense along the second path through said bistable device varies between a maximum value above and a minimum value below the value of the magnetic flux along the first path in correspondance with the varying of the reluctance of the second path.

18. The means of claim 17 in which said rotatable member has a cylindrical form and a cross sectional configuration providing a plurality of angularly spaced and radially extending portions each having a top surface for periodically moving proximate to said conducting means and varying the reluctance of the second path with the rotation of said member.

19. The means of claim 1 or 18 in which the energizing means includes a permanent magnet.

20. The means of claim 1 or 18 in which the energizing means includes an electromagnet with an energizing coil, and an energizing source provides to said coil direct current which is adjustable for controlling the magnetic flux provided to said conducting means.

21. The means of claim 17 in which the first and second sections of energizing means each have first and second pole ends with respectively opposite magnetic polarities, the second end of the first section is positioned towards the first end of the second section of opposite polarity to provide intermediate pole ends, and the first portion of said conducting means is positioned for receiving magnetic flux from the intermediate pole ends of the first and second sections of said energizing means and conducting flux from the first end of the first section through said bistable device in the first path to the second end of the first section of the energizing means.

22. The means of claim 21 in which an end of the second portion of said conducting means and the second end of the second section of the energizing means are spaced from each other with said member being positioned with respect thereto for varying the reluctance therebetween, and magnetic flux is received from the first end of the second section of the energizing means and returned to its second end along the second path through the first portion of the conducting means, said bistable device, the second portion of the conducting means, and said rotatable member.

23. The means of claim 22 in which said rotatable member has a cylindrical form and a cross sectional configuration providing a plurality of angularly spaced and radially extending portions each having a top surface for periodically moving proximate to the end of the second portion of said conducting means and the second end of the second section of the energizing means for varying and providing the minimum values respectively for the reluctance of the second path with the rotation of said member.

24. The means of claim 23 in which the second end of the first section and the first end of the second section of opposite polarities which provide the intermediate pole ends are directly joined together, and the first portion of said conducting means has an upper end contacting and conducting magnetic flux of the joined ends of the first and second sections of said energizing means.

25. The means of claim 24 in which the first and second sections of said energizing means are respectively horizontally and vertically positioned and formed to provide a substantially L-shaped configuration, the first and second portions of said conducting means extend substantially vertically, and said bistable device extends substantially horizontally between the first and second portions of said conducting means.

26. The means of claim 25 in which the second portion of said conducting means has another opposite end which is spaced from the first end of the first section of the energizing means for adjusting the reluctance and the density of magnetic flux along the first path through said bistable device.

27. The means of claim 23 in which the second end of the first section and the first end of the second section of opposite polarities which provide the intermediate pole ends are spaced from each other, and the first portion of said conducting means has a top end positioned in the space between the intermediate pole ends for conducting magnetic flux of the intermediate pole ends of the first and second sections of said energizing means.

28. The means of claim 27 in which the first and second sections of said energizing means are respectively horizontally and vertically positioned, the first portion of said conducting means has a second end extending downwardly from the top end in spaced relation to the second section of said energizing means, the second portion of said conducting means extends substantially vertically, and said bistable device extends substantially horizontally between the second end of the first portion and the second portion of said conducting means.

29. The means of claim 28 in which the second portion of said conducting means has another end which is spaced from the first end of the first section of the energizing means for adjusting the reluctance and the density of magnetic flux along the first path though said bistable device.

30. The means of claim 24 in which the first and second sections of said energizing means are respectively vertically positioned one above the other to provide a substantially elongated linear configuration, the first portion of said conducting means has a second end extending downwardly from the top end in spaced relationship to the second section of the energizing means, the second portion of said conducting means extends substantially vertically, said bistable device extends substantially horizontally between the second end of the first portion and the second portion of the conducting means, and the first portion of said conducting means includes a horizontal elongated plate for conducting magnetic flux in the first path which has a first end spaced proximate to the first end of the first section of said energizing means and a second end which is spaced from the second portion of said conducting means for adjusting the reluctance and the density of magnetic flux along the first path through said bistable device.

31. The means of claim 2, 5, or 17 in which said bistable device is subjected to a maximum flux density in one sense which is greater than the maximum flux density in the other opposite sense for causing asymetric operation of said bistable device.

32. The means of claim 18, 26 or 29 in which said member includes a shaft means for being rotationally driven for providing output signals by said detecting means.

33. The means of claim 17 or 22 in which said rotatable member comprises first and second cog wheels of cylindrical configuration each having a plurality of angularly spaced and radially extending portions with a top surface, and connecting means joining the first and second wheels and conducting magnetic flux therebetween, the top surfaces of the first and second wheels being positioned respectively for periodically moving proximate to and conducting magnetic flux in the second path between the second portion of said conducting means and said energizing means.

34. The means of claim 26 in which the energizing means includes a permanent magnet.

35. The means of claim 26 in which the energizing means includes an electromagnet with an energizing coil, and an energizing source provides to said coil direct current which is adjustable for controlling the magnetic flux provided to said conducting means.

36. The means of claim 23, 29 or 30 in which the angularly spaced and radially extending portions of said rotatable member also have a spiral configuration for being rotated by the flow of fluid therebetween.

37. The means of claim 17 in which said rotatable member comprises first and second cog wheels of cylindrical configuration each having a plurality of angularly spaced and radially extending portions with a top surface, connecting means joining the first and second wheels and conducting magnetic flux therebetween, the top surfaces of the first and second wheels being positioned respectively for periodically moving proximate to and conducting magnetic flux in the second path between the second portion of said conducting means and said energizing means, and the energizing means includes a permanent magnet.

38. The means of claim 22 in which said rotatable member comprises first and second cog wheels of cylindrical configuration each having a plurality of angularly spaced and radially extending portions with a top surface, connecting means joining the first and second wheels and conducting magnetic flux therebetween, the top surfaces of the first and second wheels being positioned respectively for periodically moving proximate to and conducting magnetic flux in the second path between the second portion of said conducting means and said energizing means, and the energizing means includes a permanent magnet.

* * * * *